United States Patent
Song et al.

(10) Patent No.: US 8,245,516 B2
(45) Date of Patent: *Aug. 21, 2012

(54) SHAPE MEMORY ALLOY ACTUATED ADAPTIVE EXHAUST NOZZLE FOR JET ENGINE

(75) Inventors: Gangbing Song, Pearland, TX (US); Ning Ma, Nanjing (CN)

(73) Assignee: University of Houston, Houston, TX (US)

( * ) Notice: Subject to any disclaimer, the term of this patent is extended or adjusted under 35 U.S.C. 154(b) by 187 days.

This patent is subject to a terminal disclaimer.

(21) Appl. No.: 12/539,242

(22) Filed: Aug. 11, 2009

(65) Prior Publication Data

US 2010/0107646 A1    May 6, 2010

Related U.S. Application Data

(63) Continuation of application No. 11/214,418, filed on Aug. 29, 2005, now Pat. No. 7,587,899.

(60) Provisional application No. 60/605,353, filed on Aug. 27, 2004.

(51) Int. Cl.
*F02K 1/00* (2006.01)
*B63H 11/10* (2006.01)
*B05B 12/00* (2006.01)

(52) U.S. Cl. ... 60/771; 60/770; 239/265.19; 239/265.33

(58) Field of Classification Search ............ 60/770, 60/771, 232, 228; 239/265.19, 265.33
See application file for complete search history.

(56) References Cited

U.S. PATENT DOCUMENTS

| | | | |
|---|---|---|---|
| 4,128,208 A * | 12/1978 | Ryan et al. | 239/265.39 |
| 4,850,535 A * | 7/1989 | Ivie | 239/265.39 |
| 4,965,545 A * | 10/1990 | Johnson | 337/140 |
| 4,994,660 A | 2/1991 | Hauer | |
| 5,082,182 A * | 1/1992 | Bruchez et al. | 239/265.35 |
| 5,174,502 A * | 12/1992 | Lippmeier et al. | 239/265.41 |
| 5,232,158 A * | 8/1993 | Barcza | 239/265.35 |
| 5,235,808 A * | 8/1993 | Taylor | 60/771 |
| 5,261,605 A * | 11/1993 | McLafferty et al. | 239/265.35 |
| 5,285,637 A * | 2/1994 | Barcza | 239/265.35 |
| 5,461,856 A * | 10/1995 | Mendia et al. | 60/230 |
| 5,685,141 A * | 11/1997 | Markstein et al. | 60/204 |
| 5,740,988 A * | 4/1998 | Ausdenmoore | 244/52 |
| 5,779,152 A * | 7/1998 | Renggli et al. | 239/265.33 |
| 6,318,070 B1 | 11/2001 | Rey et al. | |

(Continued)

OTHER PUBLICATIONS

Epps, J and I. Chopra, "In-flight tracking of helicopter rotor blades using shape memory alloy actuators," Smart Materials and Structures, 10:104-111, 2001.

(Continued)

*Primary Examiner* — Ehud Gartenberg
*Assistant Examiner* — Gerald Sung
(74) *Attorney, Agent, or Firm* — Winstead PC

(57) ABSTRACT

The proposed adaptive exhaust nozzle features an innovative use of the shape memory alloy (SMA) actuators for actively control of the opening area of the exhaust nozzle for jet engines. The SMA actuators remotely control the opening area of the exhaust nozzle through a set of mechanism. An important advantage of using SMA actuators is the reduction of weight of the actuator system for variable area exhaust nozzle. Another advantage is that the SMA actuator can be activated using the heat from the exhaust and eliminate the need of other energy source. A prototype has been designed and fabricated. The functionality of the proposed SMA actuated adaptive exhaust nozzle is verified in the open-loop tests.

5 Claims, 6 Drawing Sheets

U.S. PATENT DOCUMENTS 6,718,752 B2    4/2004   Nesbitt et al.
2005/0150223 A1*  7/2005  Rey et al. .................. 60/527

OTHER PUBLICATIONS

Pitt, D. M., J. P. Dune, E. V. White and E. Garcia, "Wind tunnel demonstration of the SMAPON smart inlet," Proceeding of SPIF, International Symposium on Smart Structures and Materials, 4332:345-356, 2001.

Rey, N., M., G. Tillman, R. M. Miller, T. Wynosky, M. J. Larkin, J. D. Flamm and L.S. Bangert, "Shape memory alloy actuation for a variable area fan nozzle," Proceeding of SPIE International Symposium on Smart Structures and Materials, 4332:371-382, 2001.

Song, G., N. Ma, N. Penny, T, Barr, H.-J. Lee and S. Arnold, "Design and control of a proof-of-concept active jet engine intake using shape memory alloy actuators," presented at 1st International Workshop on Advanced Smart Materials and Smart Structures Technology, Hawaii, 2004.

Wolf, W. and P. Gunter, "Shape adaptive structures for smart airfoils," IEEE International Conference on Multisensor Fusion and Integration for Intelligent Systems, pp. 265-270, 2001.

* cited by examiner

SHAPE MEMORY ALLOY ACTUATED ADAPTIVE EXHAUST NOZZLE FOR JET ENGINE

CROSS-REFERENCE TO RELATED APPLICATION

This application is a continuation application of U.S. application Ser. No. 11/214,418, filed on Aug. 29, 2005, entitled: SHAPE MEMORY ALLOY ACTUATED ADAPTIVE ENGINE EXHAUST NOZZLE FOR JET ENGINE, by inventor Gangbing Song, which claimed priority to and benefit of U.S. Provisional Application Ser. No. 60/605,353, filed on Aug. 27, 2004, entitled: SHAPE MEMORY ALLOY ACTUATED ADAPTIVE ENGINE EXHAUST NOZZLE FOR JET ENGINE, by inventor Gangbing Song.

This invention was made with government support under Grant No. 1-5-53207, awarded by the National Aeronautics and Space Administration. The government has certain rights in the invention.

FIELD OF THE INVENTION

The present invention relates to the use of shape memory alloy (SMA) actuator for active control of the opening area of the exhaust nozzle for jet engines. This invention particularly relates to SMA actuators that remotely control the opening area of the exhaust nozzle through a particular mechanism.

DESCRIPTION OF THE BACKGROUND ART

Exhaust nozzle of a gas turbine engine for an aircraft exerts a considerable influence on the engine performance. In particular, the opening area of the nozzle plays an important role in engine efficiency. To improve the engine efficiency over a wider range of operation conditions, variable area exhaust nozzle is desired. Conventionally, adjustment of the opening area of the exhaust nozzle is attained by using electric motors or hydraulic actuators. Shape memory allows have been used to simplify actuation of variable area exhaust nozzles. U.S. Pat. Nos. 6,318,070 B1 and 6,718,752 B2 are examples of such, and each is incorporated herein for all disclosed.

DESCRIPTION OF FIGURES AND TABLES

The invention is more particularly described in the following detailed description taken in conjunction with the accompanying drawings in which:

FIG. 1 is an illustration showing the design of the adaptive exhaust nozzle model.

FIG. 2 gives a detail of design of the SMA actuator that is isolated from the whole system.

SUMMARY OF THE INVENTION

The invented SMA actuated adaptive exhaust nozzle utilizes improved and simplified SMA actuators in control of opening area of an exhaust nozzle to reduce the weight of the actuation system. The SMA actuator uses the Nickel-Titanium SMA wire winding through groups of pulleys to obtain required actuation displacement. A difficulty in using SMA actuators is that the temperature near the exhaust nozzle is far higher than the transformation temperature of an SMA actuator. The SMA actuators of the present invention remotely control the nozzle leaves through a specific mechanism, which involves a sliding ring, supporting bars and guide trails. Upon SMA actuation, the adjustment of the opening area of the exhaust nozzle can be achieved. The design eliminates chattering phenomenon, guarantees stability of the closed loop system, and achieves stable and precise regulation, eliminating problems in the prior art.

DETAILED DESCRIPTION OF THE INVENTION

Figure 1:
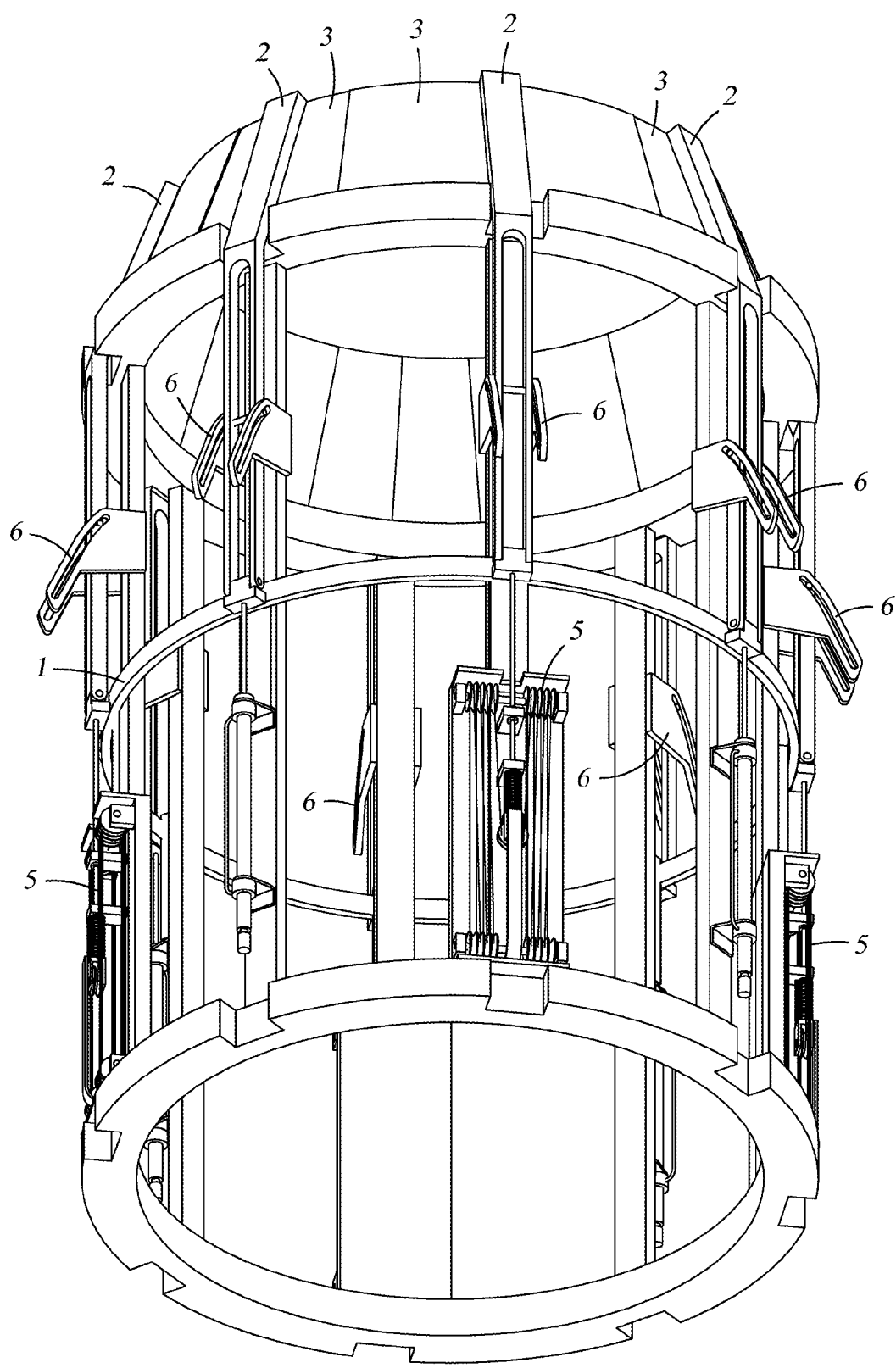
Figure 2:
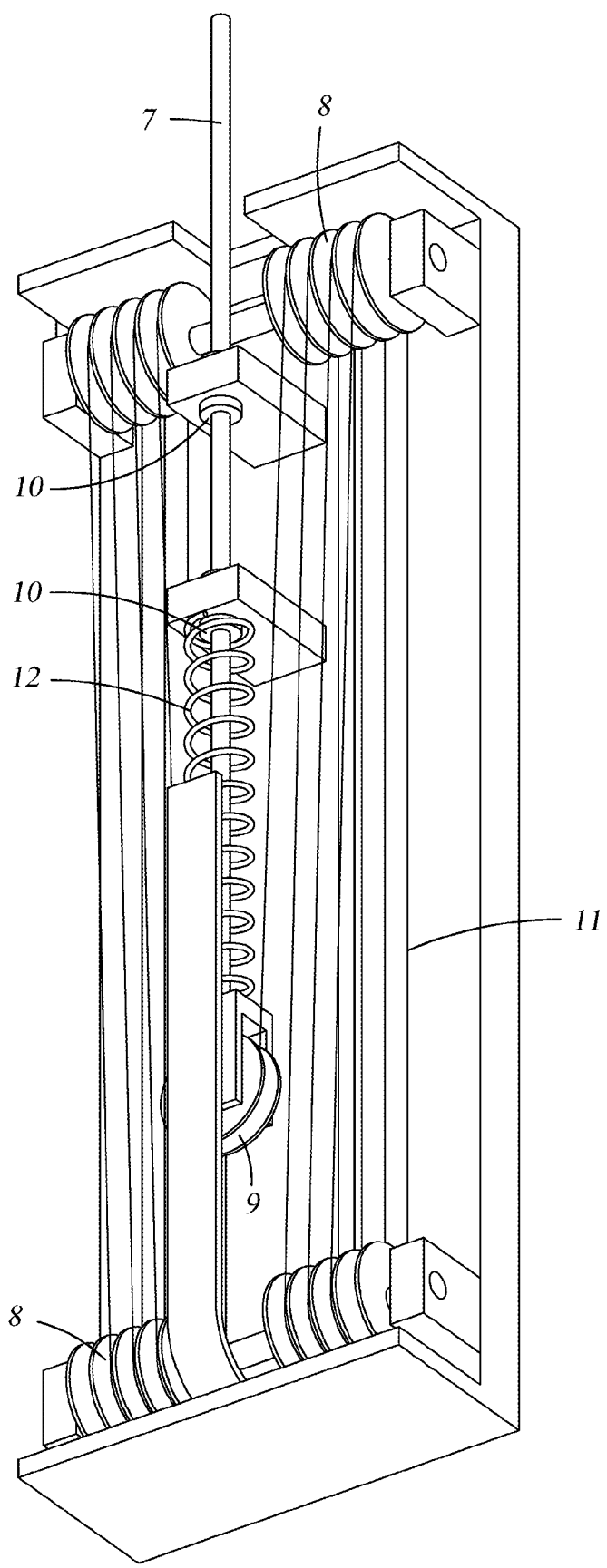

As shown in FIG. 1, the SMA actuated adaptive exhaust nozzle model is comprised of four major components: a sliding ring 1, eight supporting bars 2 with overlapping leaves 3, eight moving guides 6 and four SMA actuators 5 (as shown in FIG. 2).

Figure 3:
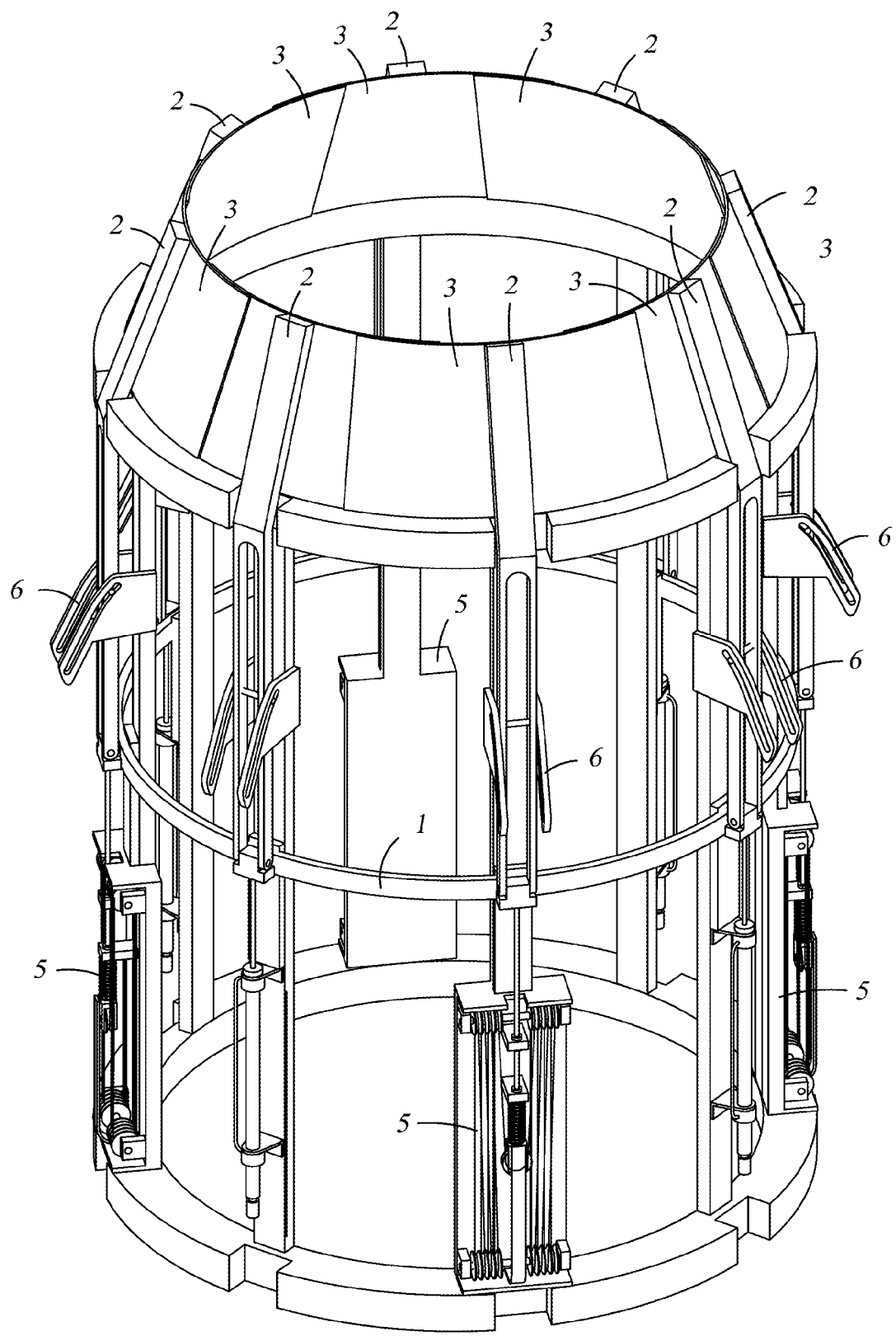
FIG. 3 shows the transmission mechanism consisting of a sliding ring, 8 supporting bars and 8 moving guides.
Figure 4:
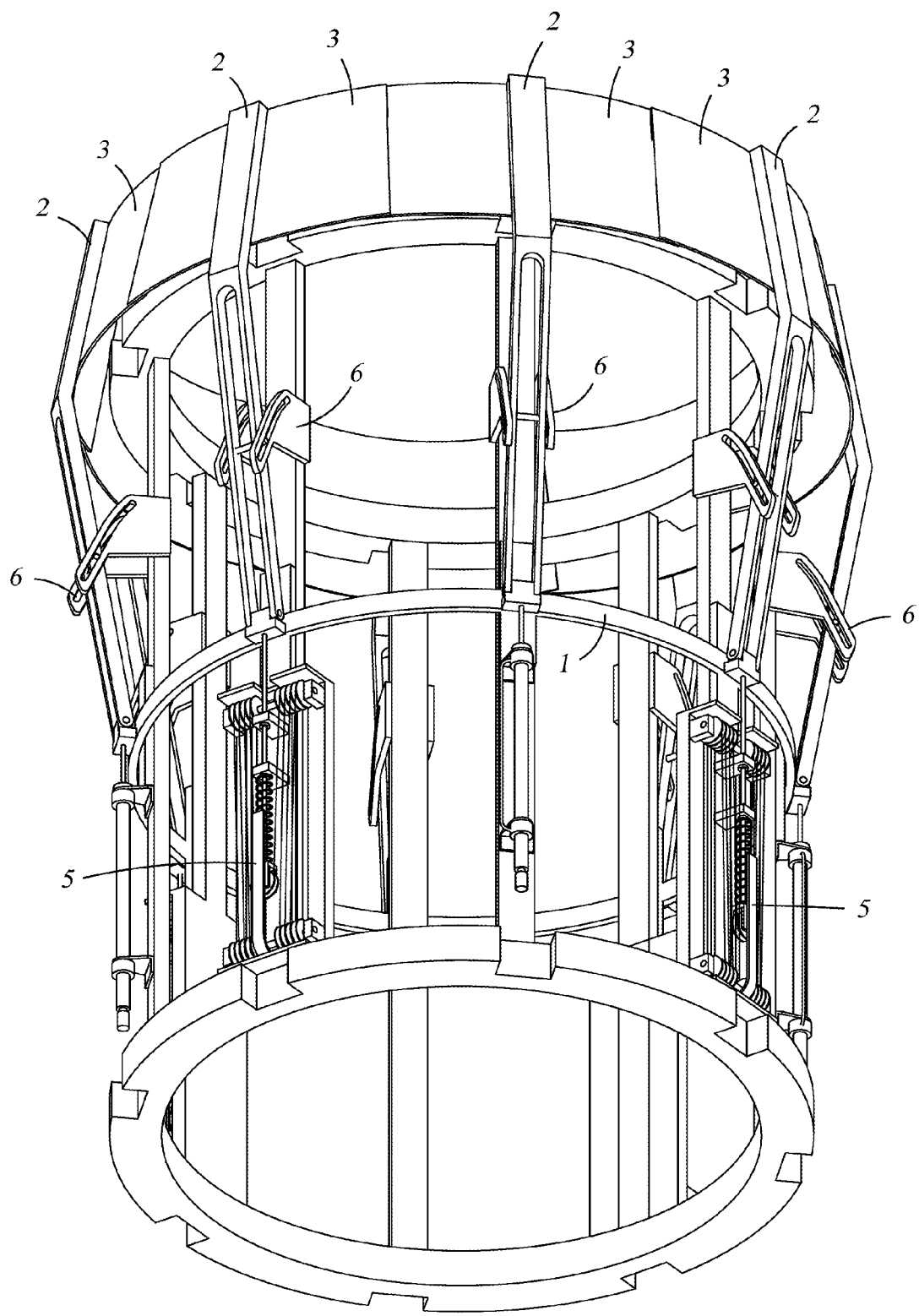
FIG. 4 shows another view of the exhaust nozzle.
Figure 5:
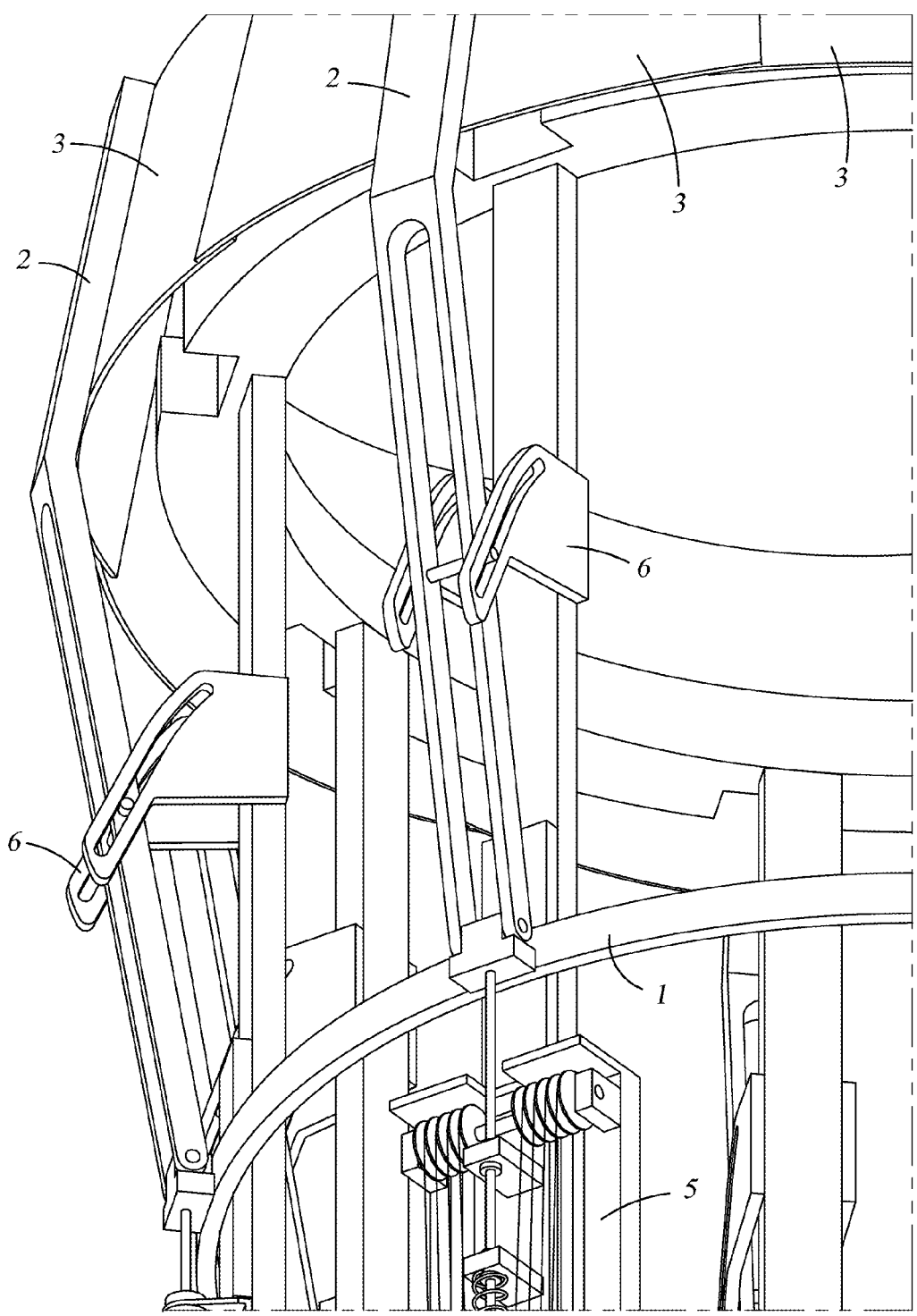
FIG. 5 shows detail of the variable nozzle mechanism.

To avoid the higher temperature region in the exhaust nozzle, the four SMA actuators 5 have to remotely control the eight overlapped curved leaves 3, which constitute the wall of the nozzle in a concentric configuration. Eight supporting bars 2 are used to link the sliding ring 1 to the leaves. As shown in FIG. 3, the eight supporting bars 2 are evenly distributed along the circumference of the sliding ring 1. One end of each supporting bar 2 is hinged on the sliding ring 1, and the other is attached to a leaf 3. The purpose of the sliding ring 1 is to ensure the simultaneous movement of the supporting bars 2. When the sliding ring 1 moves upon the SMA actuation, the supporting bars 2 move along the moving guides 6 with a desired trajectory so that the opening area of the exhaust nozzle is adjusted accordingly.

Figure 6:
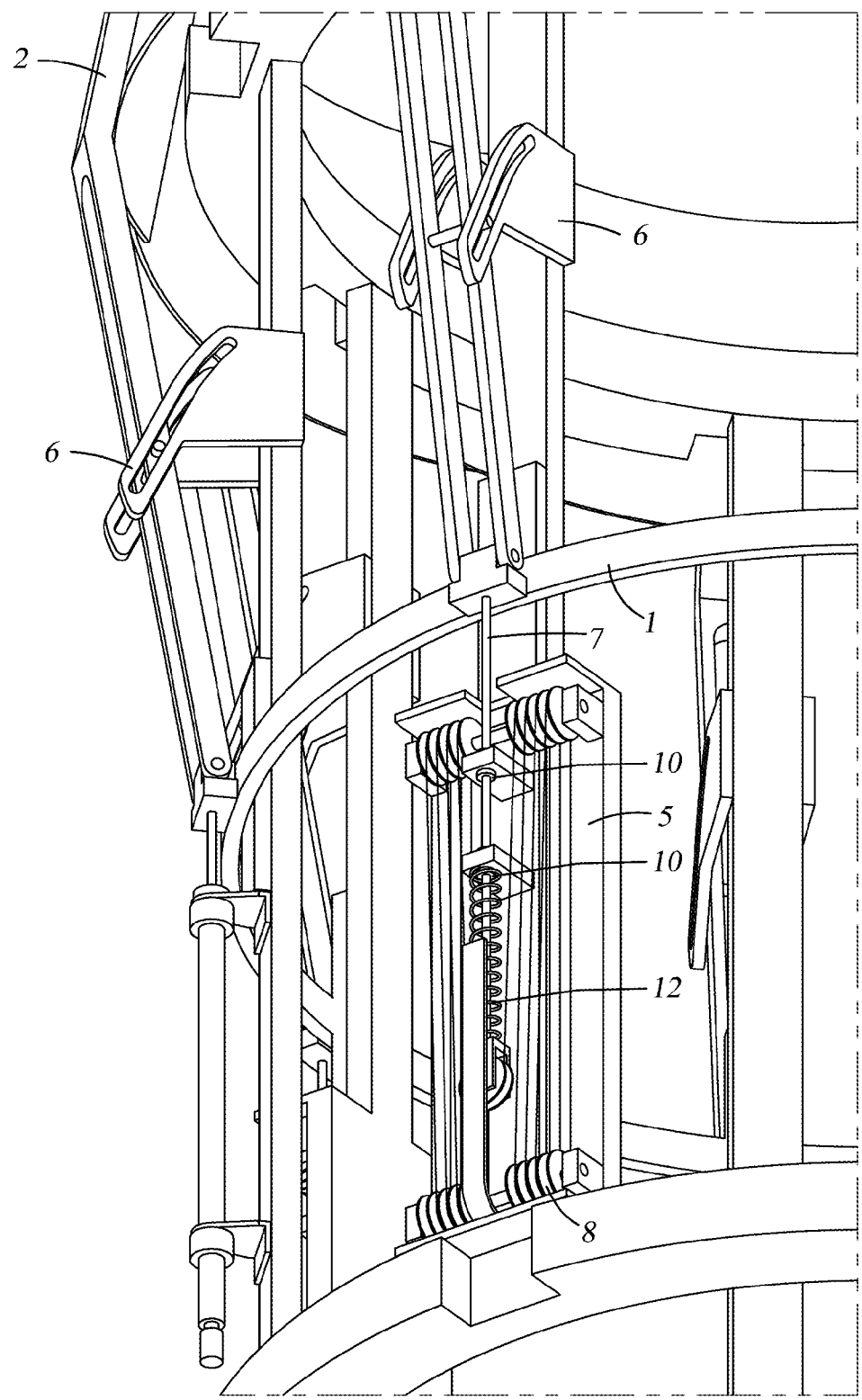
FIG. 6 shows another view of the SMA actuators.

The four SMA actuators 5 are remotely connected to the sliding ring 1 through four connecting rods 7 to provide actuation. For each SMA actuator, a Nitinol SMA wire is wound through fixed pulleys 8 and a moveable pulley 9. There are a total of four moveable pulleys 9. The movement of these four pulleys 9 will result in the motion of the slide ring 1 via the four connecting rods 7. To ensure accurate movement of the connecting rod 7, each one of them is supported by two coaxial linear bearings 10. To pretension the SMA wire 11 and to provide returning force, a constant force coil spring 12 is also connected to the moveable pulley. A closed-up view of an SMA actuator is shown in FIG. 2. and FIG. 6.

When the four SMA actuators 5 contract upon heating by using electrical current or redirecting heat air from exhaust, the moveable pulleys 9 and the connecting rods 7 will push the sliding ring 1. The opening area of the nozzle will consequently be reduced as the supporting bars move along the moving guides with a desired trajectory. As the applied electrical current is cut off and the SMA wire becomes cool, the coil springs 12 pull back the moveable pulley 9 along with the connecting rod 7, sliding ring 1 and the supporting bars 2. As a result, the exhaust nozzle opens. A manually controlled open-loop testing achieved an area reduction of more than 40% for the exhaust nozzle.

REFERENCES

The following documents are incorporated by reference into this application:

Epps, J. and I. Chopra, "In-flight tracking of helicopter rotor blades using shape memory alloy actuators," Smart Materials and Structures, 10: 104-111, 2001.

Pitt, D. M., J. P. Dune, E. V. White and E. Garcia, "Wind tunnel demonstration of the SMAPON smart inlet," Proceeding of SPIE International Symposium on Smart Structures and Materials, 4332:345-356, 2001.

Rey, N., M., G. Tillman, R. M. Miller, T. Wynosky, M. J. Larkin, J. D. Flamm and L. S. Bangert, "Shape memory alloy actuation for a variable area fan nozzle," Proceeding of SPIE International Symposium on Smart Structures and Materials, 4332:371-382, 2001.

Song, G., N. Ma, N. Penny, T, Barr, H.-J. Lee and S. Arnold, "Design and control of a proof-of-concept active jet engine intake using shape memory alloy actuators," presented at 1st International Workshop on Advanced Smart Materials and Smart Structures Technology, Hawaii, 2004.

Wolf, W. and P. Gunter, "Shape adaptive structures for smart airfoils," IEEE International Conference on Multisensor Fusion and Integration for Intelligent Systems, pp: 265-270, 2001.

All references cited herein are incorporated by reference. While this invention has been described fully and completely, it should be understood that, within the scope of the appended claims, the invention could be practiced otherwise than specifically described. Although the invention has been disclosed with reference to its preferred embodiments, from reading this description those of skill in the art can appreciate changes and modifications that may be made which do not depart from the scope and spirit of the invention as described above and claimed hereafter.

The invention claimed is:

1. An assembly utilizing shape memory alloy actuators to control the opening area of an adaptive exhaust nozzle for jet engines comprising:
   a plurality of moveable leaves for movement from a first open nozzle position to a second constricted nozzle position;
   a linkage attached to each of said leaves connected to a synchronizing element;
   a pulley system comprising a plurality of shape memory actuators attached to said synchronizing element, wherein the shape memory actuators are operative in an axial direction of a jet engine; and
   controlled actuation signals for said shape memory alloy actuators, wherein actuation signals trigger said actuators to act upon said synchronizing element to coordinate the simultaneous movement of said linkages and said leaves selectively from open to closed and from closed to open.

2. The invention of claim 1 wherein said synchronizing element comprises a sliding ring.

3. The invention of claim 1 wherein said linkage comprises:
   a supporting bar attached to each of said leaves; and
   a guide for each of said supporting bars, wherein each guide is attached to said synchronizing element.

4. The invention of claim 1 wherein said actuation signals comprise temperature differentials.

5. The invention of claim 1 wherein said actuation signals comprise electrical signals.

* * * * *